(12) United States Patent
Lipponen

(10) Patent No.: US 6,580,747 B1
(45) Date of Patent: Jun. 17, 2003

(54) METHOD AND GENERATOR FOR GENERATING ORTHOGONAL SPREADING CODE IN CDMA RADIO SYSTEM

(75) Inventor: Veli E. Lipponen, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/555,876

(22) PCT Filed: Oct. 8, 1999

(86) PCT No.: PCT/FI99/00836

§ 371 (c)(1),
(2), (4) Date: Jun. 8, 2000

(87) PCT Pub. No.: WO00/22744

PCT Pub. Date: Apr. 20, 2000

(30) Foreign Application Priority Data

Oct. 9, 1998 (FI) .................................................. 982203

(51) Int. Cl.[7] .............................. H04L 27/30; H04K 1/00
(52) U.S. Cl. ........................... 375/140; 375/130; 380/34
(58) Field of Search ................................ 375/130, 140; 380/34

(56) References Cited

U.S. PATENT DOCUMENTS

| 4,755,987 A | * 7/1988 | Lee et al. ..................... 370/479 |
| 4,872,200 A | * 10/1989 | Jansen ......................... 380/34 |
| 5,559,829 A | 9/1996 | Le Strat et al. |
| 6,005,888 A | * 12/1999 | Barron ......................... 375/208 |
| 6,459,722 B2 | * 10/2002 | Sriam et al. .................. 375/130 |
| 6,496,474 B1 | * 12/2002 | Nagatani et al. .............. 370/208 |

OTHER PUBLICATIONS

R.N. Mutagi, Pseudo noise sequences for engineers, IEEE 1996, p.p. 79–87.*
P.K.S. Wah Construction of Binary Almost Perfect Sequences Based on Extended Cyclic Difference Sets, IEEE 1998, p.p. 243–248.*

* cited by examiner

Primary Examiner—Mohammad H. Ghayour
Assistant Examiner—Tony Al-Beshrawi
(74) Attorney, Agent, or Firm—Pillsbury Winthrop LLP

(57) ABSTRACT

The invention relates to a method and a generator for generating a short orthogonal spreading code in CDMA radio system. The method includes obtaining control data the length, the running number and the code class of the spreading code. A spreading code is formed such that the running number of the spreading code in the code class is first denoted by a binary code number of the same length as the code class. Thereafter, a modified code number is formed by reversing the code number. The following operations are repeated for each chip Of the spreading code: the running number of the chip is denoted by a binary chip number of the same length as the code class, and a binary sum is formed with an AND operation between the modified code number and the chip number, and one value is formed for the chip of the spreading code with an XOR operation between all the bits of the binary sum.

10 Claims, 8 Drawing Sheets

|  | CHIP NUMBER | | | |
|---|---|---|---|---|
|  | 0 | 1 | 2 | 3 |
| CODE CLASS = 0 | | | | |
| CODE NUMBER = 0 | | | | |
| CODE | 0 | | | |
| CODE CLASS = 1 | | | | |
| CODE NUMBER = 0 | | | | |
| MODIFIED CODE NUMBER (MCN) | 0 | 0 | | |
| CHIP NUMBER (CN) | 0 | 1 | | |
| SUM = MCN AND CN | 0 | 0 | | |
| MODIFIED SUM | 00 | 00 | | |
| XOR (MODIFIED SUM) | 0 | 0 | | |
| CODE NUMBER = 1 | | | | |
| MODIFIED CODE NUMBER (MCN) | 1 | 1 | | |
| CHIP NUMBER (CN) | 0 | 1 | | |
| SUM = MCN AND CN | 0 | 1 | | |
| MODIFIED SUM | 00 | 01 | | |
| XOR (MODIFIED SUM) | 0 | 1 | | |
| CODE CLASS = 2 | | | | |
| CODE NUMBER = 0 | 00 | 00 | 00 | 00 |
| MODIFIED CODE NUMBER (MCN) | 00 | 00 | 00 | 00 |
| CHIP NUMBER (CN) | 00 | 01 | 10 | 11 |
| SUM = MCN AND CN | 00 | 00 | 00 | 00 |
| XOR (SUM) | 0 | 0 | 0 | 0 |
| CODE NUMBER = 1 | 01 | 01 | 01 | 01 |
| MODIFIED CODE NUMBER (MCN) | 10 | 10 | 10 | 10 |
| CHIP NUMBER (CN) | 00 | 01 | 10 | 11 |
| SUM = MCN AND CN | 00 | 00 | 10 | 10 |
| XOR (SUM) | 0 | 0 | 1 | 1 |
| CODE NUMBER = 2 | 10 | 10 | 10 | 10 |
| MODIFIED CODE NUMBER (MCN) | 01 | 01 | 01 | 01 |
| CHIP NUMBER (CN) | 00 | 01 | 10 | 11 |
| SUM = MCN AND CN | 00 | 01 | 00 | 01 |
| XOR (SUM) | 0 | 1 | 0 | 1 |
| CODE NUMBER = 3 | 11 | 11 | 11 | 11 |
| MODIFIED CODE NUMBER (MCN) | 11 | 11 | 11 | 11 |
| CHIP NUMBER (CN) | 00 | 01 | 10 | 11 |
| SUM = MCN AND CN | 00 | 01 | 10 | 11 |
| XOR (SUM) | 0 | 1 | 1 | 0 |

Fig 5A

CODE CLASS = 3

| | CHIP NUMBER | | | | | | | |
|---|---|---|---|---|---|---|---|---|
| | 0 | 1 | 2 | 3 | 4 | 5 | 6 | 7 |
| CODE NUMBER = 0 | 000 | 000 | 000 | 000 | 000 | 000 | 000 | 000 |
| MODIFIED CODE NUMBER (MCN) | 000 | 000 | 000 | 000 | 000 | 000 | 000 | 000 |
| CHIP NUMBER (CN) | 000 | 001 | 010 | 011 | 100 | 101 | 110 | 111 |
| SUM = MCN AND CN | 000 | 000 | 000 | 000 | 000 | 000 | 000 | 000 |
| XOR (SUM) | 0 | 0 | 0 | 0 | 0 | 0 | 0 | 0 |
| CODE NUMBER = 1 | 001 | 001 | 001 | 001 | 001 | 001 | 001 | 001 |
| MODIFIED CODE NUMBER (MCN) | 100 | 100 | 100 | 100 | 100 | 100 | 100 | 100 |
| CHIP NUMBER (CN) | 000 | 001 | 010 | 011 | 100 | 101 | 110 | 111 |
| SUM = MCN AND CN | 000 | 000 | 000 | 000 | 100 | 100 | 100 | 100 |
| XOR (SUM) | 0 | 0 | 0 | 0 | 1 | 1 | 1 | 1 |
| CODE NUMBER = 2 | 010 | 010 | 010 | 010 | 010 | 010 | 010 | 010 |
| MODIFIED CODE NUMBER (MCN) | 010 | 010 | 010 | 010 | 010 | 010 | 010 | 010 |
| CHIP NUMBER (CN) | 000 | 001 | 010 | 011 | 100 | 101 | 110 | 111 |
| SUM = MCN AND CN | 000 | 000 | 010 | 010 | 000 | 000 | 010 | 010 |
| XOR (SUM) | 0 | 0 | 1 | 1 | 0 | 0 | 1 | 1 |
| CODE NUMBER = 3 | 011 | 011 | 011 | 011 | 011 | 011 | 011 | 011 |
| MODIFIED CODE NUMBER (MCN) | 110 | 110 | 110 | 110 | 110 | 110 | 110 | 110 |
| CHIP NUMBER (CN) | 000 | 001 | 010 | 011 | 100 | 101 | 110 | 111 |
| SUM = MCN AND CN | 000 | 000 | 010 | 010 | 100 | 100 | 110 | 110 |
| XOR (SUM) | 0 | 0 | 1 | 1 | 1 | 1 | 0 | 0 |
| CODE NUMBER = 4 | 100 | 100 | 100 | 100 | 100 | 100 | 100 | 100 |
| MODIFIED CODE NUMBER (MCN) | 001 | 001 | 001 | 001 | 001 | 001 | 001 | 001 |
| CHIP NUMBER (CN) | 000 | 001 | 010 | 011 | 100 | 101 | 110 | 111 |
| SUM = MCN AND CN | 000 | 001 | 000 | 001 | 000 | 001 | 000 | 001 |
| XOR (SUM) | 0 | 1 | 0 | 1 | 0 | 1 | 0 | 1 |
| CODE NUMBER = 5 | 101 | 101 | 101 | 101 | 101 | 101 | 101 | 101 |
| MODIFIED CODE NUMBER (MCN) | 101 | 101 | 101 | 101 | 101 | 101 | 101 | 101 |
| CHIP NUMBER (CN) | 000 | 001 | 010 | 011 | 100 | 101 | 110 | 111 |
| SUM = MCN AND CN | 000 | 001 | 000 | 001 | 100 | 101 | 100 | 101 |
| XOR (SUM) | 0 | 1 | 0 | 1 | 1 | 0 | 1 | 0 |
| CODE NUMBER = 6 | 110 | 110 | 110 | 110 | 110 | 110 | 110 | 110 |
| MODIFIED CODE NUMBER (MCN) | 011 | 011 | 011 | 011 | 011 | 011 | 011 | 011 |
| CHIP NUMBER (CN) | 000 | 001 | 010 | 011 | 100 | 101 | 110 | 111 |
| SUM = MCN AND CN | 000 | 001 | 010 | 011 | 000 | 001 | 010 | 011 |
| XOR (SUM) | 0 | 1 | 1 | 0 | 0 | 1 | 1 | 0 |
| CODE NUMBER = 7 | 111 | 111 | 111 | 111 | 111 | 111 | 111 | 111 |
| MODIFIED CODE NUMBER (MCN) | 111 | 111 | 111 | 111 | 111 | 111 | 111 | 111 |
| CHIP NUMBER (CN) | 000 | 001 | 010 | 011 | 100 | 101 | 110 | 111 |
| SUM = MCN AND CN | 000 | 001 | 010 | 011 | 100 | 101 | 110 | 111 |
| XOR (SUM) | 0 | 1 | 1 | 0 | 1 | 0 | 0 | 1 |

Fig 5B

METHOD AND GENERATOR FOR GENERATING ORTHOGONAL SPREADING CODE IN CDMA RADIO SYSTEM

FIELD OF THE INVENTION

The invention relates to a method and a generator for generating an orthogonal spreading code in a CDMA radio system, particularly a short orthogonal spreading code used for channelization.

BACKGROUND OF THE INVENTION

In radio systems utilizing code division multiple access (CDMA), a radio resource is allocated to several different users on a code division basis. The payload of each user is spread on a broad frequency band, for example 5 MHz, by multiplying the payload by a spreading code. A receiver is able to separate a desired signal by multiplying the received signal by the spreading code used for the spreading. Parts of a spreading code are referred to as 'chips', which are basically bits or binary numbers. The value of a chip can be denoted by 'zero' and 'one', or by 'one' and 'minus one' in real numbers. The chip rate is typically considerably higher than the payload rate, for example it is more than 100-fold the payload rate.

'Spreading code' refers to a short spreading code used for channelization and, for example, not to a considerably longer scrambling code used to identify a transmitter. The length of a spreading code is typically at most a few hundreds or thousands of chips, whereas the length of a scrambling code can be, for example, a few tens of thousands of chips.

The used spreading codes are as mutually orthogonal as possible. Spreading codes are obtained for example by a Hadamard matrix. Hadamard matrix $M_n$ is an n×n matrix (n is an even integer) formed of zeros and ones, such that any matrix row differs from any other matrix row exactly in n/2 positions. One matrix row thus comprises only zeros and the other rows contain half zeros and half ones. When n=2, the following Hadamard matrix is obtained:

$$M_2 = \begin{bmatrix} 0 & 0 \\ 0 & 1 \end{bmatrix} \quad (1)$$

Hadamard matrix $M_n$ provides Hadamard matrix $M_{2n}$ with the following relation:

$$M_{2n} = \begin{bmatrix} M_n & M_n \\ M_n & \overline{M_n} \end{bmatrix} \quad (2)$$

wherein matrix $\overline{M_n}$ refers to a complement of matrix $M_n$, i.e. zeros have been replaced with ones and ones with zeros. Matrix 1 thus provides $$M_4 = \begin{bmatrix} 0 & 0 & 0 & 0 \\ 0 & 1 & 0 & 1 \\ 0 & 0 & 1 & 1 \\ 0 & 1 & 1 & 0 \end{bmatrix} \quad (3)$$

Further, matrix 3 provides $$M_8 = \begin{bmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{bmatrix} \quad (4)$$

If the elements that are possible in the Hadamard matrices described above, i.e. zeros and ones, are denoted by '1' and '−1', the matrix rows are mutually orthogonal. The values could also be inverted, if desired, i.e. zeros replaced with ones and vice versa, but this does not change the properties of the matrix. For example matrix 1 could also be given in the following forms:

$$M_2 = \begin{bmatrix} 1 & 1 \\ 1 & 0 \end{bmatrix}, M_2 = \begin{bmatrix} 1 & 1 \\ 1 & -1 \end{bmatrix}$$

Each matrix row forms one spreading code. The length of the spreading code depends on the desired spreading factor. The spreading codes can be numbered for example such that the code class of the spreading code is indicated together with the running number of the code in the code class in question. The code class can be solved from the following equation: 2 to the power of the code class=the length of the spreading code, i.e. the code class is a two-base logarithm of the spreading code. Thus, for example matrix 4 comprises the following spreading codes (the subscript describes the code class, and the running number is in parenthesis):

SPREADINGCODE$_3$(0)={0,0,0,0,0,0,00}
SPREADINGCODE$_3$(1)={0,1,0,1,0,1,0,1}
SPREADINGCODE$_3$(2)={0,0,1,1,0,0,1,1}
SPREADINGCODE$_3$(3)={0,1,1,0,0,1,1,0}
SPREADINGCODE$_3$(4)={0,0,0,0,1,1,1,1}
SPREADINGCODE$_3$(5)={0,1,0,1,1,0,1,0}
SPREADINGCODE$_3$(6)={0,0,1,1,1,1,0,0}
SPREADINGCODE$_3$(7)={0,1,1,0,1,0,0,1}

In the prior art all the short spreading codes are stored in a memory of a transceiver. For example in the case of a code in code class 8, there are 256 different 256-chip codes stored in the memory, i.e. memory is needed for 256×256 bits= altogether 65536 bits. Shorter spreading codes can be generated from the stored long codes, wherefore there is no need to separately store the spreading codes of the lower code classes.

BRIEF DESCRIPTION OF THE INVENTION

An object of the invention is to develop a method of generating a spreading code when necessary, so that there is no need to store each spreading code in the memory. This is achieved with the method described below. This is a method of generating an orthogonal spreading code in a CDMA radio system, the method comprising steps of obtaining the length of the spreading code, obtaining the running number of the spreading code, obtaining the code class of the spreading code, denoting the running number of the spreading code in the code class in question by a binary code number of the same length as the code class, forming a modified code number by reversing the code number, repeating the following operations for each chip of the spreading code: denoting the running number of the chip by a binary chip number of the same length as the code class, and forming a binary sum with an AND operation between the modified code number and the chip number, and forming one value for the chip of the spreading code with an XOR operation between all the bits of the binary sum.

The invention also relates to a generator for an orthogonal spreading code in a CDMA radio system, comprising means for obtaining the length of the spreading code, means for obtaining the running number of the spreading code, means for obtaining the code class of the spreading code, means for denoting the running number of the spreading code in the code class in question by a binary code number of the same length as the code class, means for forming a modified code number by reversing the code number, means for repeating the following operations for each chip of the spreading code: means for denoting the running number of the chip by a binary chip number of the same length as the code class, and means for forming a binary sum with an AND operation between the modified code number and the chip number, and means for forming one value for the chip of the spreading code with an XOR operation between all the bits of the binary sum.

The preferred embodiments of the invention are disclosed in the dependent claims.

The invention is based on the idea that spreading codes are not stored but they are generated, whenever required, by means of an efficient calculation method described below.

The arrangement according to the invention saves memory considerably. Also, when the mathematical operations required are compared to the disclosed matrix operations, it can be said that the present method requires rather a little calculation power. Up to code class 8 the spreading codes can be generated by means of only about 100 to 200 combinational gates without the need for memory.

BRIEF DESCRIPTION OF THE FIGURES

The invention will be described below in greater detail in connection with the preferred embodiments and with reference to the accompanying drawings, in which FIGS. 5A and 5B show the operating principle of the generation method.

DETAILED DESCRIPTION OF THE INVENTION

The invention can be used in various mobile telephone systems which employ code division multiple access (CDMA). The examples describe the use of the invention in a universal mobile telephone system (UMTS) employing direct sequence wideband CDMA (WCDMA), without restricting the invention thereto, however. For example the ITM-2000 mobile telephone system developed by the ARIB (Association of Radio Industries and Businesses) in Japan and the UMTS that is being developed in Europe are systems according to the invention. The examples are based on a description of the WCDMA system, illustrated in greater detail in the ETSI (European Telecommunications Standards Institute) specification 'The ETSI UMTS Terrestrial Radio Access (UTRA) ITU-R RTT Candidate Submission (Tdoc SMG2 260/98, May/June 1998)', which is incorporated herein by reference.

The structure of the UMTS will be described with reference to FIGS. 1A and 1B. FIG. 1B shows only blocks that are essential for describing the invention, but it is evident for those skilled in the art that a conventional mobile telephone system also comprises other functions and structures, which do not have to be described in greater detail herein. The main parts of a mobile telephone system are a core network CN, a UMTS terrestrial radio access network UTRAN and a user equipment UE. The interface between the CN and the UTRAN is called lu and the interface between the UTRAN and the UE is called Uu.

The UTRAN consists of radio network subsystems RNS. The interface between RNSs is called lur. An RNS comprises a radio network controller RNC and one or several nodes B. The interface between an RNC and node B is called lub. The coverage area of node B, i.e. a cell, is denoted in FIG. 1B with C.

Figure 1A:
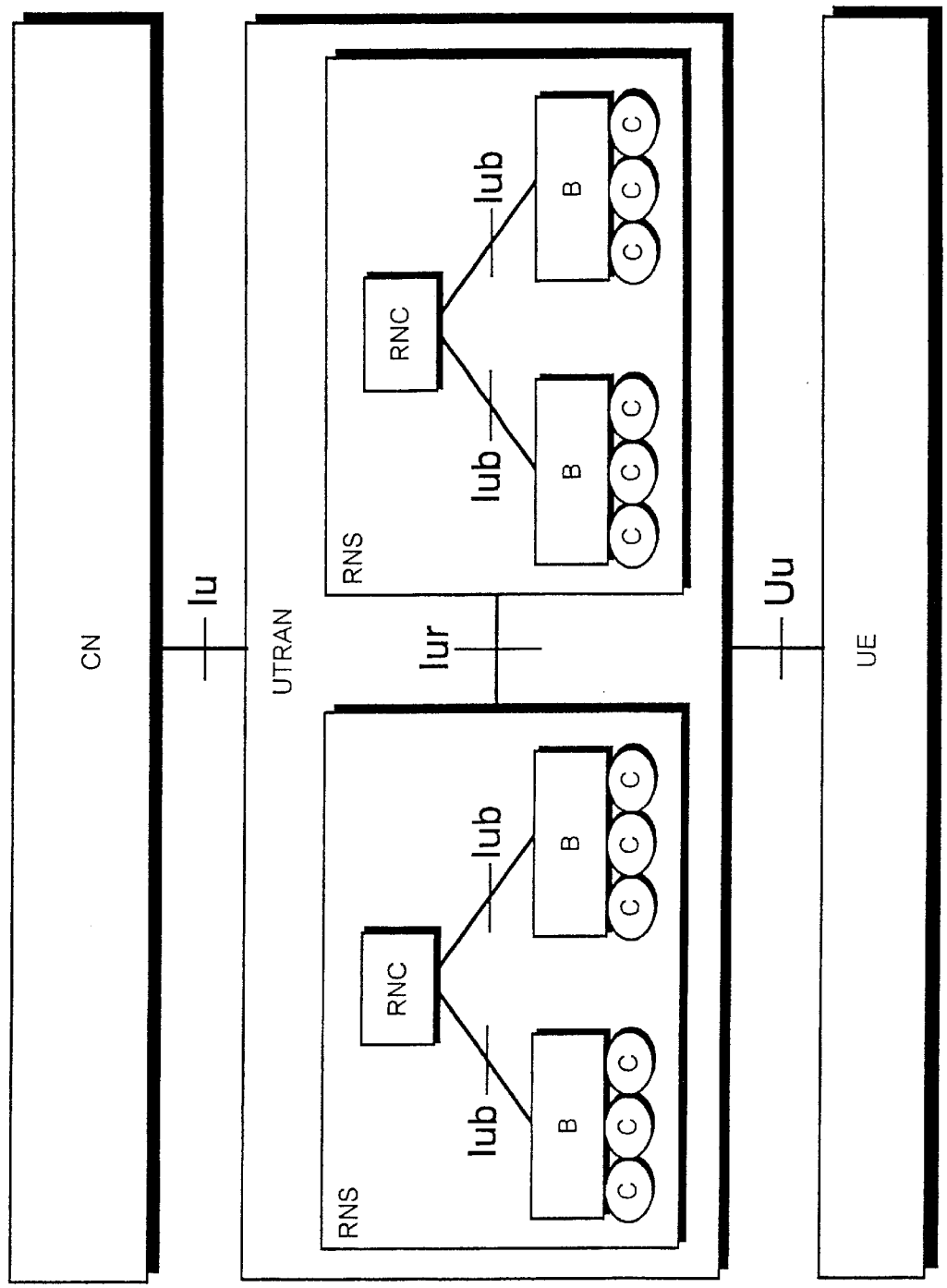
FIGS. 1A and 1B show a mobile telephone system.
Figure 1B:
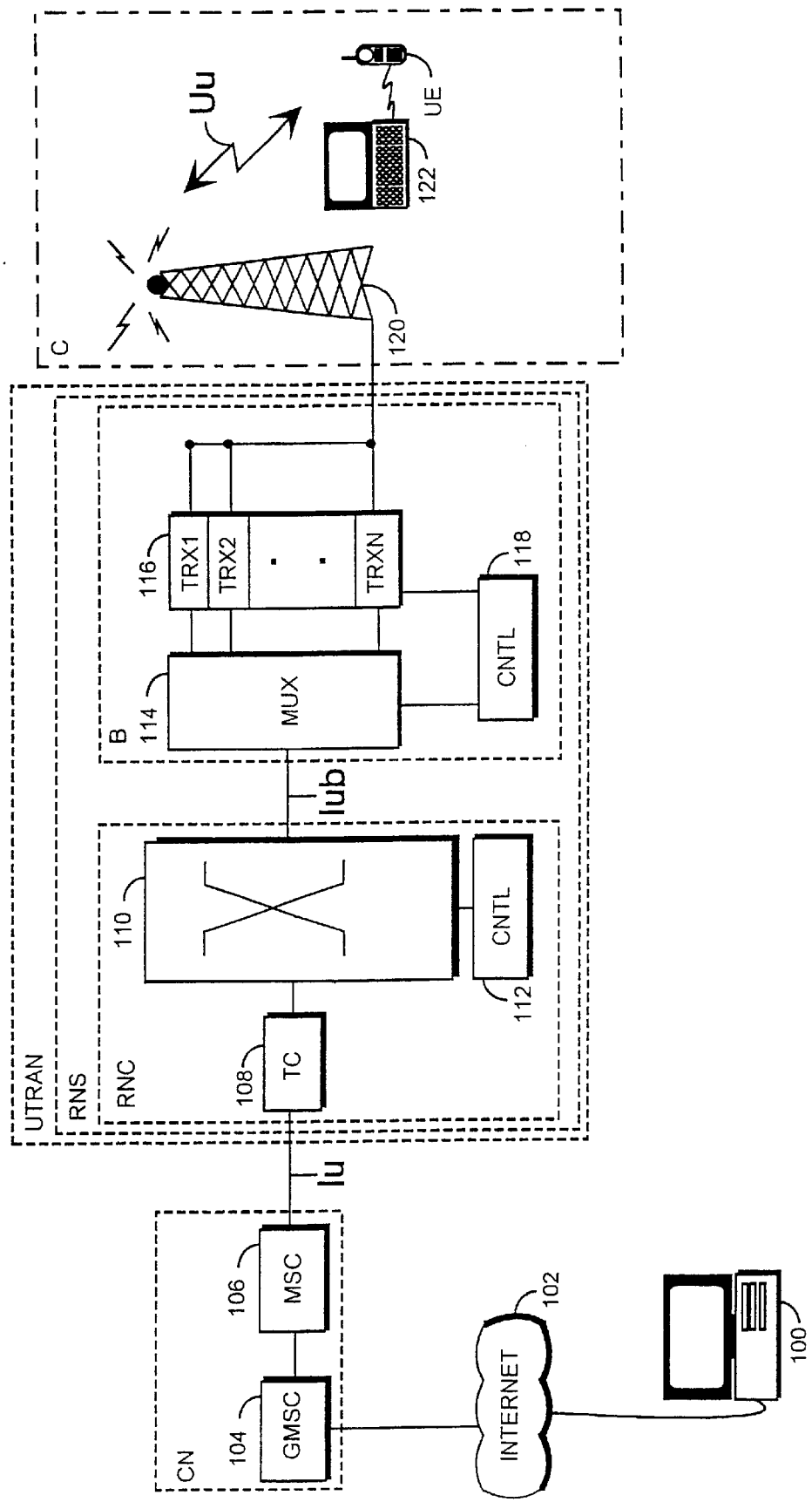

The description in FIG. 1A is highly abstract, wherefore it is clarified in FIG. 1B by showing the approximate correspondences between the elements of the GSM system and the UMTS. It should be noted that the mapping shown in the figures is in no way binding but only approximate since the responsibilities and functions of different parts of the UMTS are still under development.

FIG. 1B shows packet switched transmission via the Internet 102 from a computer 100 connected to a mobile telephone system to a portable computer 122 connected to a user equipment UE. The user equipment can be, for example, a fixedly positioned equipment, a terminal placed in a vehicle or a portable hand-held terminal equipment. The radio network infrastructure UTRAN consists of radio network subsystems RNS or base station systems. An RNS comprises a radio network controller RNC or a base station controller, and at least one node B or base station controlled by the RNC.

A base station B comprises a multiplexer 114, transceivers 116 and a control unit 118 which controls the operation of the multiplexer 114 and the transceivers 116. The multiplexer 114 places the traffic and control channels used by several transceivers 116 on a transmission link lub.

The transceivers 116 of the base station B are connected to an antenna unit 120, which implements a bidirectional radio link Uu to the user equipment UE. The structure of the frames transmitted over the bidirectional radio link Uu is strictly specified.

The base station controller RNC comprises a switching field 110 and a control unit 112. The switching field 110 is used to connect speech and data and to combine signalling circuits. The base station system formed of the base station B and the base station controller RNC also comprises a transcoder 108. The division of operations between the base station controller RNC and the base station B and the physical structure of the elements may vary in different implementations. The base station B typically manages the implementation of the radio path as described above. The base station controller RNC typically controls the following matters: radio resource management, control of inter-cell handover, power control, timing and synchronization, and paging of subscriber terminals.

The transcoder 108 is usually situated as close to a mobile services switching centre 106 as possible in order that speech can be transmitted in a mobile telephone system form between the transcoder 108 and the base station controller RNC, thus saving transmission capacity. The transcoder 108 adapts different digital speech coding forms used between a public switched telephone network and a mobile telephone network to each other such that it converts, for example, a 64 kbit/s fixed network form into some other (such as a 13 kbit/s) form of the cellular radio network, and vice versa. The required equipment is not described in greater detail herein. Suffice it to say that speech is the only type of data that is converted in a transcoder 122. The control unit 112 performs call control, mobility management, collection of statistical data, and signalling.

The core network CN consists of the infrastructure of the mobile telephone system outside the UTRAN. From the devices of the core network, FIG. 1B shows the mobile services switching centre 106 and a gateway mobile services switching centre 104, which manages the connections from the mobile telephone system to the outside world, in this case to the Internet 102.

A subscriber terminal can be, for example, a portable mobile phone, a telephone placed in a vehicle, a wireless local loop terminal or a data transmission equipment integrated into a computer.

Figure 2A:
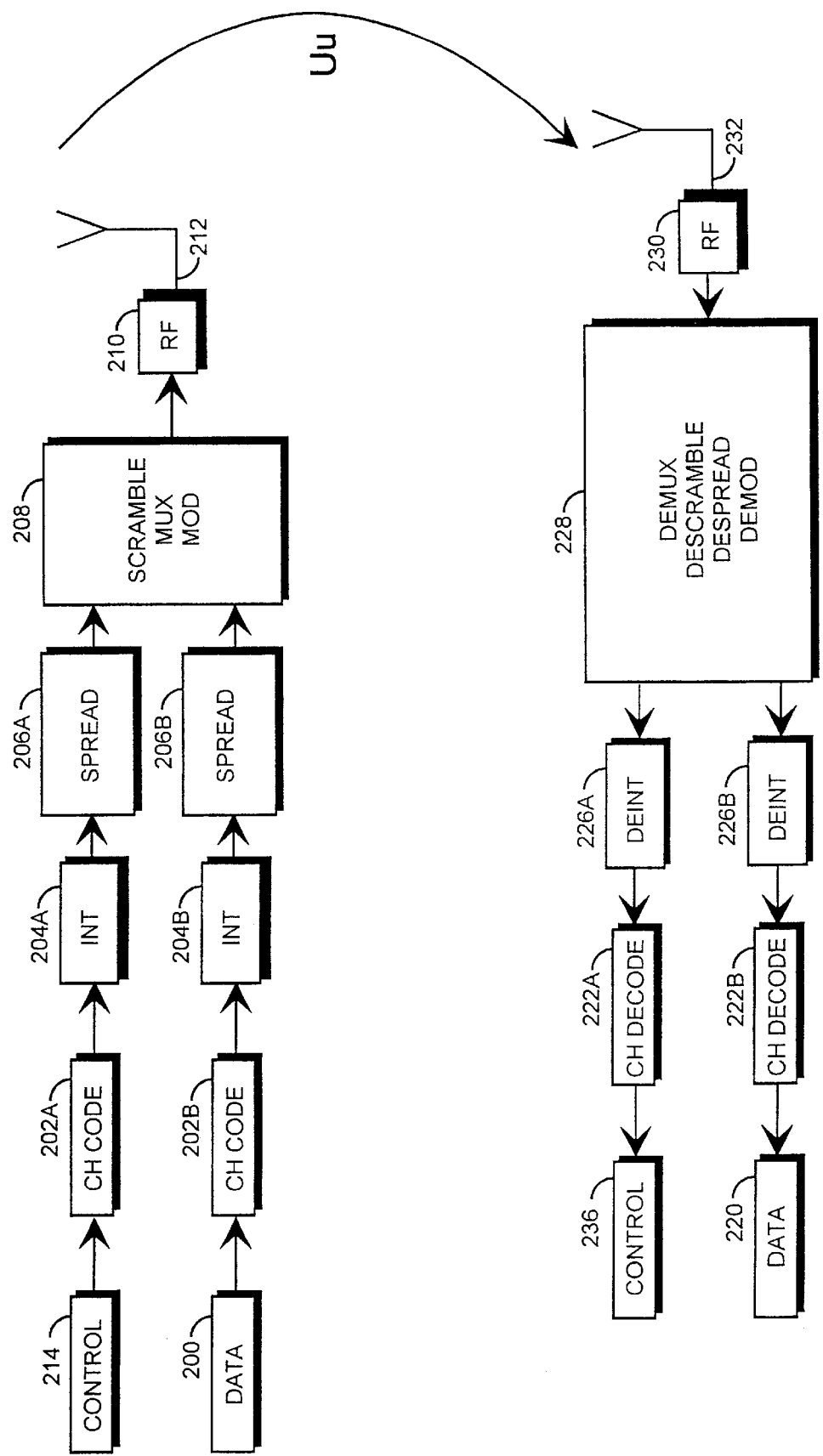
FIG. 2A shows a transmitter and a receiver in a mobile telephone system.

FIG. 2A shows the operation of a radio transmitter and a radio receiver. The radio transmitter can be situated in node B or in a user equipment UE, and the radio receiver can be positioned in the UE or in node B.

The upper part of FIG. 2A shows the basic functions of a radio transmitter. Different services to be placed on a physical channel include speech, data, a moving or still video image, and system control channels. The figure shows the processing of a control channel and data. Different services require different source coding means, for example speech calls for a speech codec. However, source coding means are not shown in FIG. 2A for the sake of clarity.

Pilot bits used by the receiver in channel estimation are placed on the control channel 214. User data 200 is placed on a data channel.

Different channels are thus subjected to different types of channel coding in blocks 202A and 202B. Examples of channel coding include different block codes, one example of which is the cyclic redundancy check (CRC). Other typical coding forms used include convolutional coding and different modifications thereof, such as punctured convolutional coding or turbo coding. However, the aforementioned pilot bits are not channel-coded since the purpose is to detect distortions caused by a channel in a signal.

After the channel coding the different channels are interleaved in an interleaver 204A, 204B. The purpose of interleaving is to facilitate error correction. In interleaving the bits of different services are intermixed in a specified manner, so that momentary fading on the radio path does not necessarily corrupt the transmitted information. The interleaved bits are thereafter spread by a spreading code in blocks 206A and 206B. The obtained chips are scrambled by a scrambling code and modulated in block 208. The separate signals are thereafter combined in block 208 for transmission via the same transmitter. The combining can be, for example, time multiplexing or IQ multiplexing (I=in-phase, Q=quadrature).

In the end the combined signal is supplied to radio-frequency parts 210, which can comprise different power amplifiers and filters restricting the bandwidth. The closed loop power control used in the transmission usually controls a transmit power amplifier provided in this block. An analog radio signal is thereafter transmitted via an antenna 212 to the radio path Uu.

The lower part of FIG. 2A shows the main functions of a radio receiver. The radio receiver is typically a rake receiver. An analog radio-frequency signal is received from the radio path Uu with an antenna 232. The signal is applied to radio-frequency parts 230 comprising a filter, which filters out frequencies outside the desired frequency band.

The signal is thereafter converted in block 228 into an intermediate frequency or directly to a baseband, whereafter the converted signal is sampled and quantized. Since the signal has propagated along several paths, the multipath-propagated signal components are combined in block 228, which comprises the actual rake fingers of the receiver similarly as in the prior art arrangements. In block 228, the different channels are subjected to demultiplexing, demodulation and decoding of the scrambling code and the spreading code.

The obtained physical channels are deinterleaved in deinterleaving means 226A, 226B. Each channel is directed to a specific channel decoding block 222A, 222B, where the channel coding used in the transmission, such as block coding and convolutional coding, is decoded. The convolutional coding is preferably decoded by a Viterbi decoder. Each transmitted channel 236, 220 can be supplied to further processing, for example the data 220 is applied to a computer 122 connected to the user equipment UE. The system control channels are supplied to a control unit 236 of the radio receiver.

Figure 4:
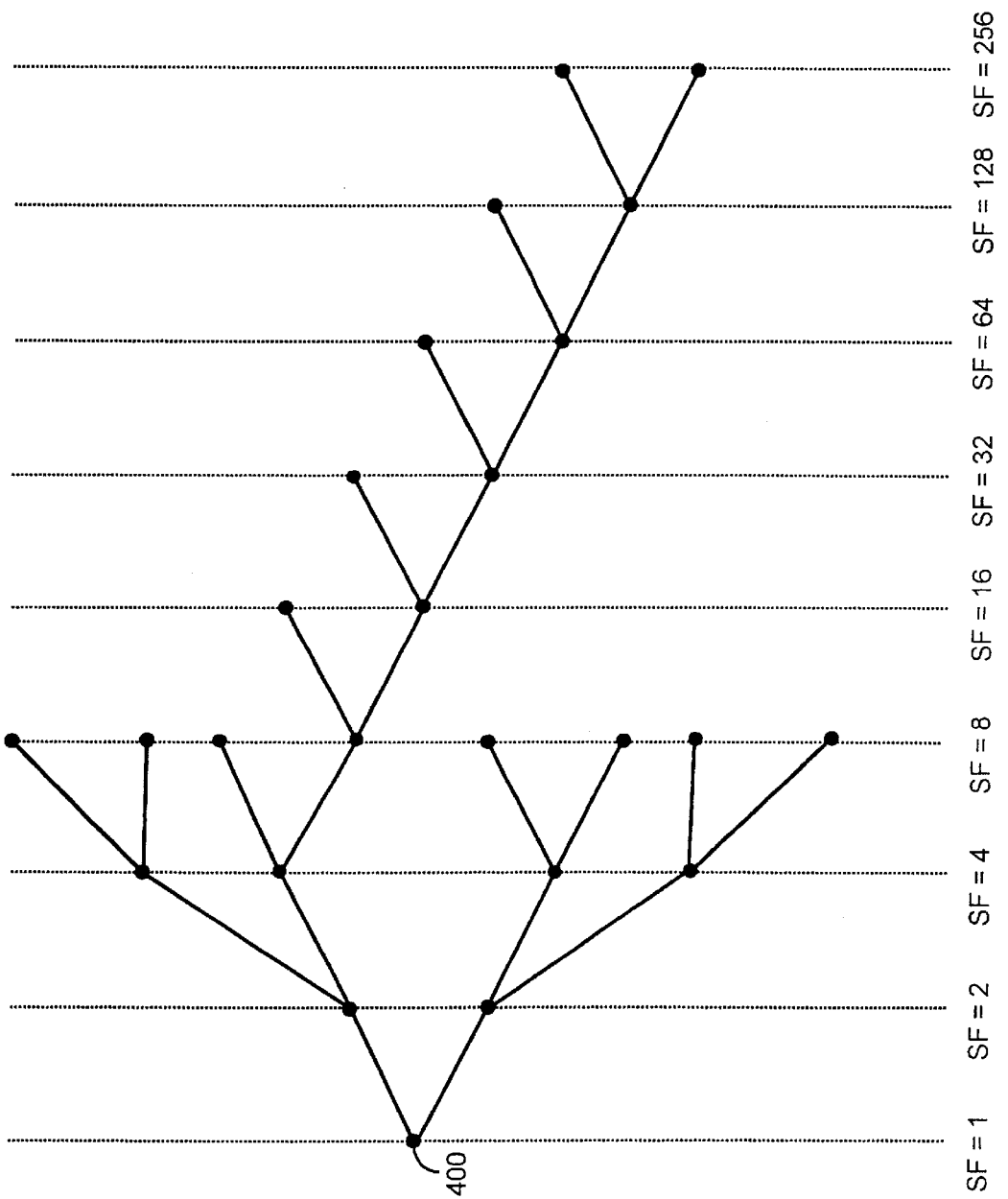
FIG. 4 shows a spreading code tree.

FIG. 4 shows different spreading codes. Each point 400 represents one possible spreading code. The vertical dotted lines denote different spreading factors SF=1, SF=2, SF=4, SF=8, SF=16, SF=32, SF=64, SF=128, SF=256. The codes on each vertical dotted line are mutually orthogonal. The maximum number of mutually orthogonal spreading codes that can be used simultaneously can be as high as 1024, but FIG. 4 only shows up to 256 different codes. For example in the IMT-2000 system used in Japan, with a carrier of 4.096 megachips spreading factor SF=256 corresponds to a transfer rate of 16 kbit/s, and the corresponding highest transfer rate in practice is achieved with the spreading factor SF=4, which gives a data transfer rate of 1024 kbit/s. The transfer rate on a channel thus varies in steps of 32, 64, 128, 512 and 1024 kbit/s, and the spreading factor changes correspondingly as follows: 256, 128, 64, 32, 16, 8 and 4. The data transfer rate allocated to a user depends on the channel coding used. For example with ⅓ convolutional coding, the user data transfer rate is usually about one third of the channel data transfer rate. The spreading factor indicates the length of the spreading code. For example the spreading code corresponding to spreading factor SF=1 is (1). Spreading factor SF=2 has two mutually orthogonal spreading codes: (1,1) and (1,−1). Further, spreading factor SF=4 has four mutually orthogonal spreading codes: below a higher-level spreading code (1,1) are spreading codes (1,1,1,1) and (1,1,−1,−1), and below another higher-level spreading code (1,−1) are spreading codes (1,−1,1,−1) and (1,−1,−1,1). The formation of spreading codes is continued in this manner as the process proceeds to lower levels in the code tree. Spreading codes on a particular level are always mutually orthogonal. Similarly, a spreading code on a specific level is orthogonal with all spreading codes on subsequent levels derived from another spreading code on the same level.

During transmission one symbol is multiplied by a spreading code in order to spread the data to the frequency band to be used. For example, when spreading code 256 is used, 256 chips represent one symbol. Correspondingly, when spreading code 16 is used, 16 chips represent one symbol.

Figure 2B:
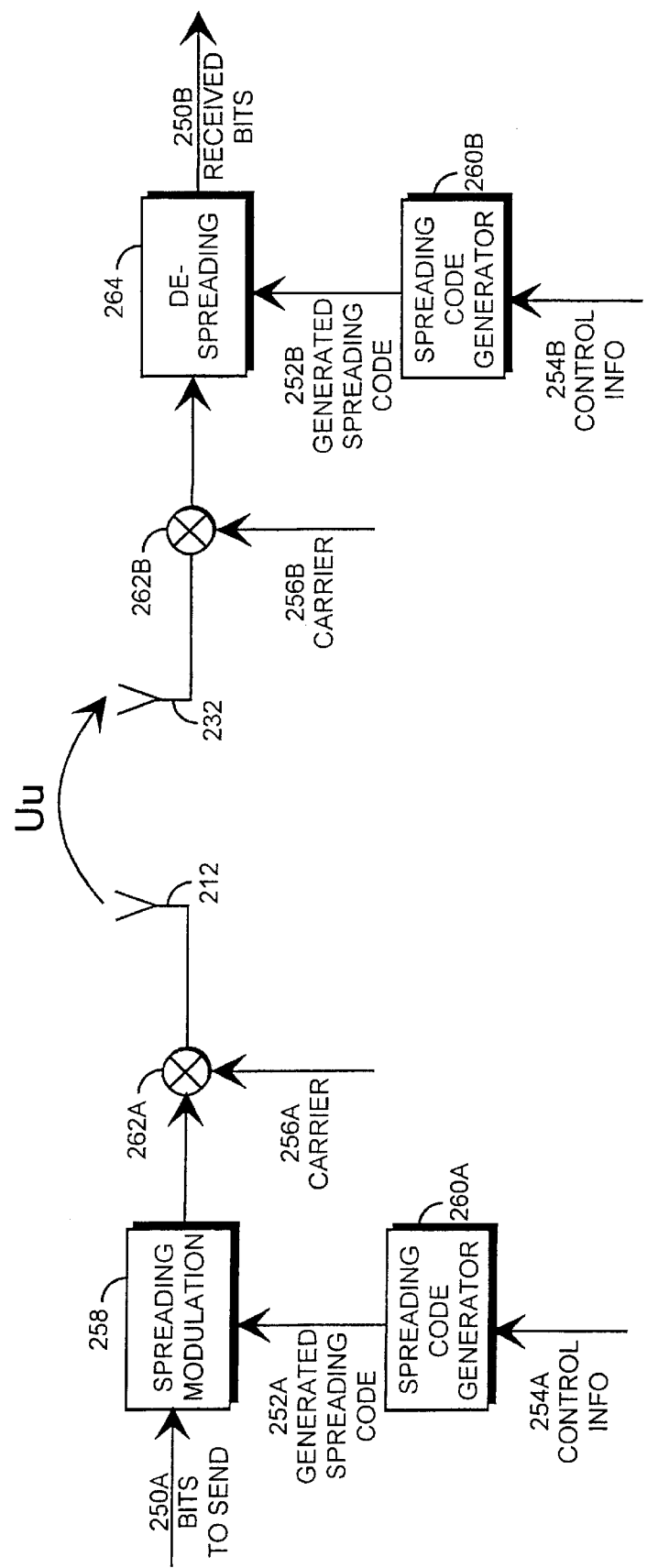
FIG. 2B shows processing of a spreading code in a transmitter and a receiver.

FIG. 2B shows in greater detail the spreading of a channel by a spreading code and the modulation thereof, such that the operations shown in FIG. 2A which are not essential for the spreading are not illustrated. On the left side of the figure, a channel bit stream 250A arrives in block 258, where spreading is carried out by multiplying the bit stream 250A by a spreading code 252A. The obtained spread channel is multiplied 262A by a carrier 256A for transmission. Correspondingly, a signal received at the reception is multiplied 262B by a carrier 256B. The spreading is cancelled in block 264 by multiplying the received demodulated signal by the spreading code 252B used. The result is received bits 250B, which are then deinterleaved and decoded as shown in FIG. 2A.

In the prior art, a spreading code generator 260A, 260B is implemented such that spreading codes are stored in a memory. A desired spreading code 252A, 252B is retrieved from the memory on the basis of control data 254A, 254B, such as the running number and code class of the spreading code.

In the invention, a required spreading code is generated on the basis of the control data 254A, 254B. The control data 254A, 254B includes the length, running number and code class of the spreading code.

Figure 3:
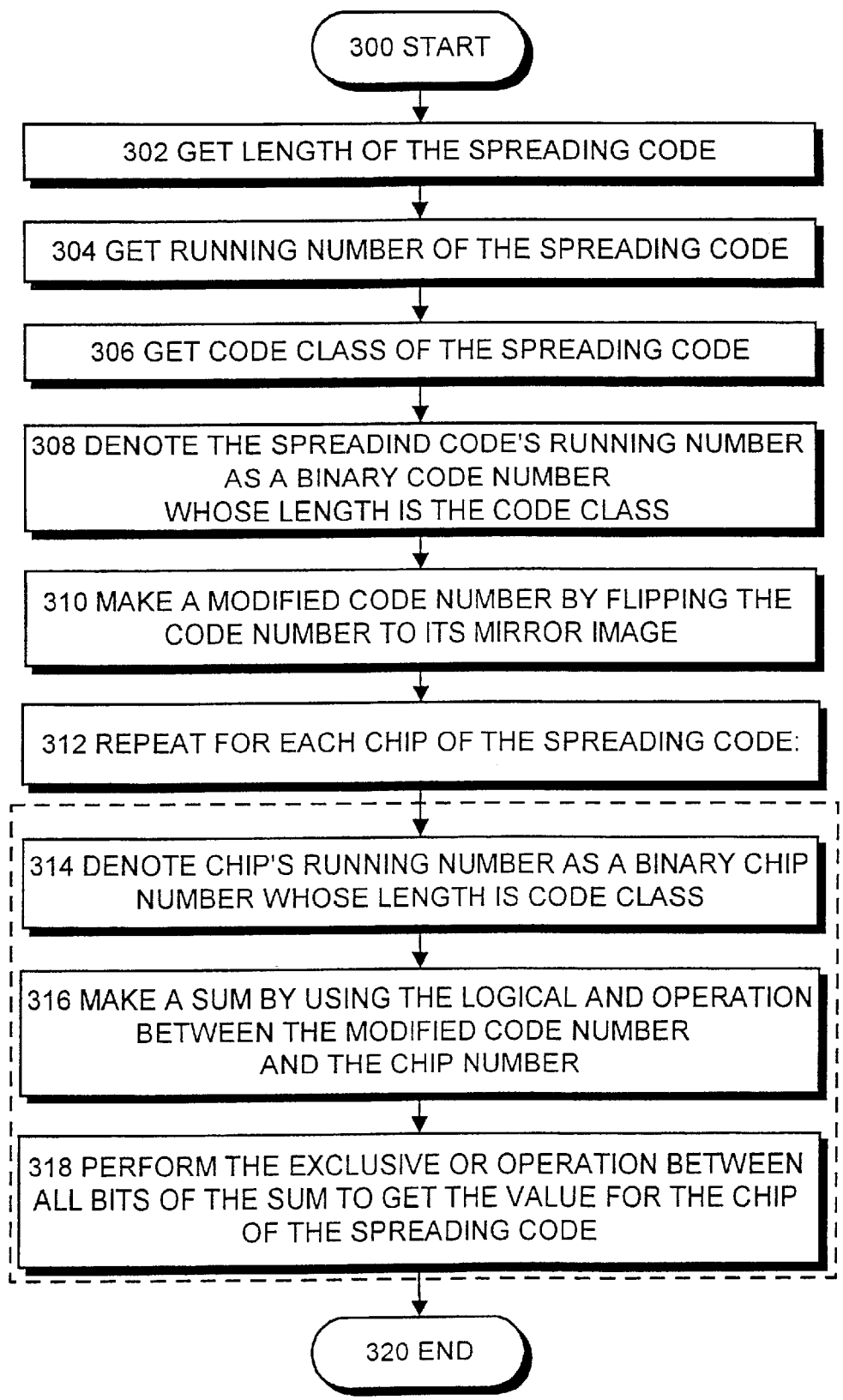
FIG. 3 is a flowchart of a method of generating a spreading code.

FIG. 3 shows the steps of the method according to the invention. The method starts from block 300. The length of the spreading code is obtained in block 302. The running number of the spreading code is obtained in block 304. The code class of the spreading code is obtained in block 306. If required, the code class of the spreading code can be obtained by calculating the code class to the power of which number two should be raised in order to obtain the length of the spreading code. The spreading code is generated on the basis of the obtained control data.

FIGS. 5A and 5B show the implementation of the method in different code classes. The method cannot be used in code class 0. The only code in code class 0 is 0, which actually performs no spreading. The only codes in code class 1 are {0,0} and {0,1} and they can be calculated by modifying the method in a manner described below. The method according to the invention can be used from code class 2 upwards, without an upper limit. A spreading code is generated by means of the following simple mathematical and logical operations.

In block 308, the running number of the spreading code in the code class is denoted by a binary code number of the same length as the code class. The value of the binary code number is between zero and the total number of spreading codes in the code class in question, less one. For example in code class 2, the spreading code whose running number is 1 is denoted by binary number 01.

In block 310, a modified code number is formed by reversing the code number, i.e. by flipping the code number to its mirror image. Therefore, code number 01 in code class 2 will become modified code number 10. The reversal of the code number is implemented by replacing the least significant bit of the code number with the most significant bit and by replacing the second least significant bit with the second most significant bit. All the bits are changed correspondingly until the most significant bit has been replaced with the least significant bit.

Next in block 312, blocks 314, 316 and 318 are repeated for each chip of a spreading code.

In block 314, the running number of the chip is denoted by a binary chip number of the same length as the code class. The value of the binary chip number is between zero and the total number of the chips, less one. The chip numbers are thus given binary values 00, 01, 10, 11 during the four rounds.

In block 316, a binary sum is formed with an AND operation between the modified code number and the chip number. The AND operation is a "logical and" operation. The truth table of the AND operation is as follows:

| A | B | A AND B |
|---|---|---------|
| 0 | 0 | 0 |
| 0 | 1 | 0 |
| 1 | 0 | 0 |
| 1 | 1 | 1 |

In block 316, the following results are obtained during the four rounds:

an AND operation between chip number 00 and modified code number 10 provides 00, an AND operation between chip number 01 and modified code number 10 provides 00, an AND operation between chip number 10 and modified code number 10 provides 10, an AND operation between chip number 11 and modified code number 10 provides 10.

Finally in block 318, one value is formed for the chip of the spreading code with an XOR operation between all the bits of the binary sum. The XOR operation is a logical "exclusive or" operation. The truth table of the XOR operation is as follows:

| A | B | A XOR B |
|---|---|---------|
| 0 | 0 | 0 |
| 0 | 1 | 1 |
| 1 | 0 | 1 |
| 1 | 1 | 0 |

In other words, as regards code number 01 in code class 2, XOR operations are carried out for each chip:

an XOR operation for sum 00 of the first chip provides 0, an XOR operation for sum 00 of the second chip provides 0, an XOR operation for sum 10 of the third chip provides 1, an XOR operation for sum 10 of the fourth chip provides 1.

The spreading code formed for code number 01 in code class 2 is therefore {0, 0, 1, 1}. In some systems the result can also be inverted, in which case the spreading code is {1, 1, 0, 0}. In systems utilizing real numbers the spreading code can be either {1, 1, −1, −1} or {−1, −1, 1, 1}.

FIG. 5A shows the formation of the spreading codes in code class 2 according to the aforementioned principle. FIG. 5B shows the formation of the spreading codes in code class 3 according to the aforementioned principle.

The formation of code class 1 requires a certain amount of additional logic in the method according to the invention. As shown in FIG. 5A, it requires an additional step where a modified sum MODIFIED SUM is formed by lengthening the sum by one bit whose value is 'zero'. This must be done in order to subject the modified sum to an XOR operation since such an operation is not determined for a single element.

The spreading code generator comprises means for obtaining the length of the spreading code, means for obtaining the running number of the spreading code, and means for obtaining the code class of the spreading code. The generator also comprises means for denoting the running number of the code in the code class in question by a binary code number of the same length as the code class, means for forming a modified code number by reversing the code number, means for repeating the following operations for each chip of the spreading code: means for denoting the running number of the chip by a binary chip number of the same length as the code class, and means for forming a binary sum with an AND operation between the modified code number and the chip number, and means for forming one value for the chip of the spreading code with an XOR operation between all the bits of the binary sum. The spreading code generator is preferably implemented by means of hardware. A purely software implementation is also possible, but it requires a sufficiently powerful processor so that the value of the chip of the spreading code can be calculated during one chip, if required. An ASIC (Application Specific Integrated Circuit) implementation will be described below by means of VHDL (Very High Speed Integrated Circuit Hardware Description Language):

```
FOR i IN 0 TO (code_class-1) LOOP
    short_code_bus(i)<=((chip_nr(code_class-1) AND
        code_nr(i)));
END LOOP;
short code<=not xor_reduce(short_code_bus((code_
    class-1) downto 0));
    where code_class varies between 3 to 7 (i.e. classes 4
        to 8)
        chip_nr varies between 0 to 15(,31(,63(,127(,255))))
        short_code_bus varies between 4 to 8 bits
        code_nr defines the number of code in this code
            class
```

Even though the invention is described above with reference to an example according to the accompanying drawings, it is clear that the invention is not restricted thereto but it can be modified in several ways within the scope of the inventive idea disclosed in the appended claims.

What is claimed is:

1. A method of generating an orthogonal spreading code in a CDMA radio system, the method comprising steps of
    (302) obtaining the length of the spreading code,
    (304) obtaining the running number of the spreading code,
    (306) obtaining the code class of the spreading code, characterized by
        (308) denoting the running number of the spreading code in the code class by a binary code number of the same length as the code class,
        (310) forming a modified code number by reversing the code number,
        (312) repeating the following operations for each chip of the spreading code:
            (314) denoting the running number of the chip by a binary chip number of the same length as the code class, and
            (316) forming a binary sum with an AND operation between the modified code number and the chip number, and
            (318) forming one value for the chip of the spreading code with an XOR operation between all the bits of the binary sum.

2. A method according to claim 1, characterized by inverting the chip value obtained with the XOR operation.

3. A method according to claim 1, characterized by obtaining the code class of the spreading code by calculating the code class to the power of which number two should be raised in order to obtain the length of the spreading code.

4. A method according to claim 1, characterized by implementing the reversal of the code number by replacing the least significant bit of the code number with the most significant bit, and the second least significant bit of the code number with the second most significant bit, and by changing all the bits similarly until the most significant bit has been replaced with the least significant bit.

5. A method according to claim 1, characterized in that the value of the binary code number is between zero and the total number of the spreading codes in the code class in question, less one, and that the value of the binary chip number is between zero and the total number of the chips, less one.

6. A generator for an orthogonal spreading code in a CDMA radio system, comprising
    means for obtaining the length of the spreading code,
    means for obtaining the running number of the spreading code,
    means for obtaining the code class of the spreading code, characterized in that it also comprises
        means for denoting the running number of the spreading code in the code class by a binary code number of the same length as the code class,
        means for forming a modified code number by reversing the code number,
        means for repeating the following operations for each chip of the spreading code:
            means for denoting the running number of the chip by a binary chip number of the same length as the code class, and
            means for forming a binary sum with an AND operation between the modified code number and the chip number, and
            means for forming one value for the chip of the spreading code with an XOR operation between all the bits of the binary sum.

7. A generator according to claim 6, characterized in that it comprises means for inverting the chip value obtained with the XOR operation.

8. A generator according to claim 6, characterized in that the means for obtaining the code class of the spreading code comprise means for calculating the code class to the power of which number two should be raised in order to obtain the length of the spreading code.

9. A generator according to claim 6, characterized in that the means for forming the modified code number comprise means for replacing the least significant bit of the code number with the most significant bit, and the second least significant bit of the code number with the second most significant bit, and by changing all the bits similarly until the most significant bit has been replaced with the least significant bit.

10. A generator according to claim 6, characterized in that the means for denoting the running number of the spreading code process a binary code number whose value is between zero and the total number of the spreading codes in the code class in question, less one, and that the means for denoting the running number of the chip process a binary chip number whose value is between zero and the total number of the chips, less one.

* * * * *